INVENTOR.
ROY E. GARTEN, JR.
BY Floyd Trimble
ATTORNEY

INVENTOR.
ROY E. GARTEN, Jr.
BY Floyd Trimble
ATTORNEY

Dec. 1, 1964  R. E. GARTEN, JR  3,159,808
METHOD AND APPARATUS FOR PLOTTING SEISMIC DATA
Filed Sept. 15, 1958  5 Sheets-Sheet 4

INVENTOR.
ROY E. GARTEN JR.
BY Floyd Trimble
ATTORNEY

Dec. 1, 1964  R. E. GARTEN, JR  3,159,808
METHOD AND APPARATUS FOR PLOTTING SEISMIC DATA
Filed Sept. 15, 1958  5 Sheets-Sheet 5

INVENTOR.
ROY E. GARTEN, JR.
BY Floyd Trimble
ATTORNEY

United States Patent Office 3,159,808
Patented Dec. 1, 1964

3,159,808
METHOD AND APPARATUS FOR PLOTTING
SEISMIC DATA
Roy E. Garten, Jr., Ponca City, Okla., assignor to Continental Oil Company, Ponca City, Okla., a corporation of Delaware
Filed Sept. 15, 1958, Ser. No. 761,175
3 Claims. (Cl. 340—15.5)

This invention relates generally to improvements in the art of seismic prospecting and more particularly, but not by way of limitation, to an improved method and apparatus for plotting seismic data.

As it is well known in the art of seismic prospecting, the seismic energy generated by a source in a local area and reflected and refracted by subsurface strata is picked up at the surface by one or more detectors which convert the seismic energy returning to the earth's surface to electrical representations of the seismic energy. Generally speaking, the electrical variations produced by the detectors are recorded by magnetic or optical means onto a record which will contain several traces representative of the electrical variations. For the purpose of this specification and the appended claims, and as is common in the art, the word "seismogram" shall refer either to the electrical variations produced by the detectors or reproduced from the recorded traces, or a record which contains a series of traces which are in turn representative of the electrical variations produced by detectors. In other words, a "seismogram" is a visual or electrical representation of the movement of the earth's surface at two or more points.

In the art of seismic prospecting, it is common practice to transfer selected portions of the seismogram (which are indicative of subsurface structural features) onto a graphic visual representation commonly called a seismic section. There are two types of such sections: the seismic time section wherein the longitudinal axis of the section represents the reflection time, and the seismic depth section wherein the longitudinal axis of the section represents the depth derived from the time by means of the velocity function (average velocity as a function of reflection time). For a long time, this transfer of selected portions was performed manually, but recently various automatic transferring schemes have been proposed.

For example, such schemes are disclosed in U.S. Patent No. 2,767,388, issued to W. M. Rust, Jr., on October 16, 1956, and in a pending application No. 581,046, filed on April 27, 1956, by H. H. Moody, now U.S. Patent No. 2,941,184, and assigned to the assignee of this application. In both of these schemes the transfer is accomplished by replacing portions of a seismic trace by marks produced by sharp electrical pulses whose generation is controlled by the occurrence of a predetermined condition within the portion of seismic data which is to be transferred. Examples of such predetermined conditions are: peaks, troughs, and quiescent points. The seismic sections produced by these methods are very useful. However, a large amount of information is lost in the process, since the marks can only indicate the time of occurrence of the predetermined condition.

The present invention provides a method of and apparatus for increasing the amount of information transferred from the seismic record to the seismic section by controlling the duration and/or the intensity of the pulses utilized in the plotting process.

Broadly stated, the invention may be defined as the process of automatically plotting a seismic section wherein the final visual representation consists of a plurality of marks spaced in accordance with a function of the time relation between amplitude variations above a predetermined value of a seismic trace, the improvement which comprises varying the appearance of said marks in accordance with another characteristic of said amplitude variations.

One object of my invention is to provide a method and apparatus of the type described which retains more of the information contained in the transferred portion of the seismic trace.

Another object of my invention is to provide a method and apparatus of the said type which improves the appearance and utility of the completed time or depth section.

A further object of my invention is to provide an improved method and apparatus for automatically plotting a seismic time or depth section of the type wherein electrical or light pulses are used to produce marks indicative of the occurrence of a predetermined condition for each seismic trace, and in which the improvement relates to the modification of the appearance of the said marks to indicate other characteristics of the amplitude variations of the seismic trace.

Other objects and advantages of the invention will be evident from the following detailed description, when read in conjunction with the accompanying drawings which illustrate my invention.

Figure 1:
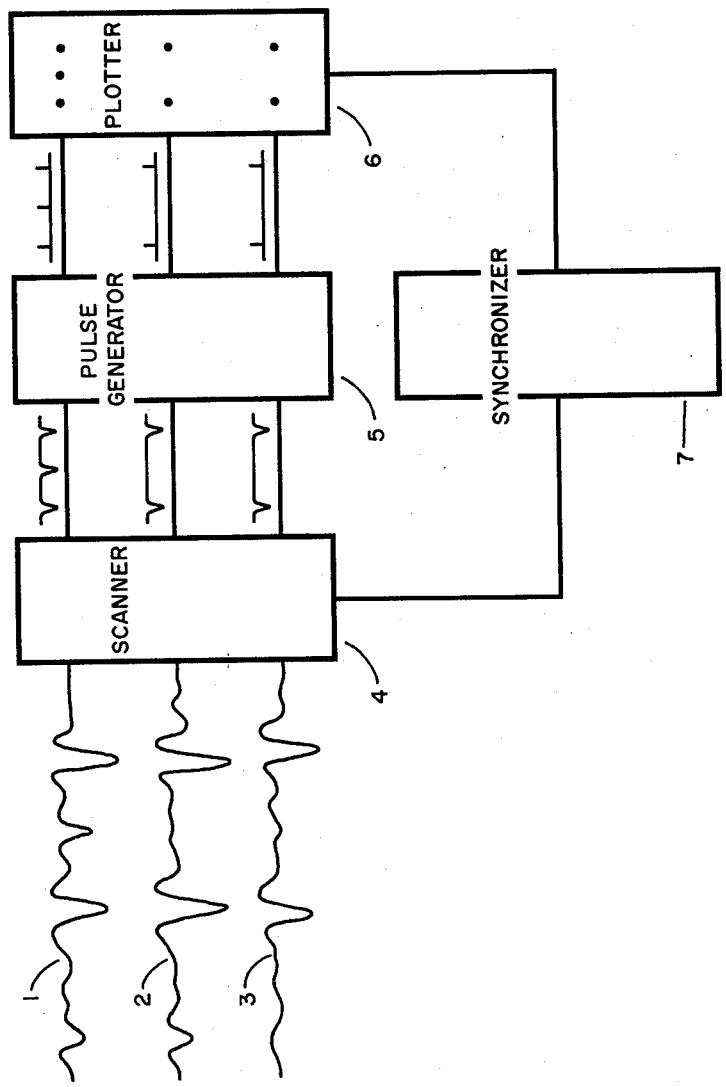
FIGURE 1 is a block diagram representation of the type of automatic seismic data plotter which is improved by the present invention.

Referring now to the drawings and particularly to FIGURE 1, references characters 1, 2, and 3 designate portions of three seismic traces schematically representative of a seismogram. It will be understood that an actual seismogram contains many more traces, with the traces being of longer duration. As previously indicated, these seismic traces are obtained from the output of seismic wave detectors located at various points on the surface of the ground, and represent the seismic energy reaching the detectors after generation of the seismic energy at a properly located point. The traces 1, 2, and 3 are representations (either electrical or recorded) of the electrical variations produced by the various detectors (properly amplified and filtered) after the initiation of seismic energy. For the purpose of my invention, these electrical variations may be used as they are produced by the detectors, or they may be recorded and reproduced in electrical form at a later time.

It should also be noted that the traces 1, 2, and 3 may be corrected for geometrical differences in length of path (removal of step-out time) and for differences in elevation and thickness of the weathered zone, as is common in the art. These corrections are usually made during reproduction of a seismogram, and the corrected signals (or traces) are used in the production of a time or depth section. Such correcting methods, as well as the apparatus employed, are well known in the art and are therefore not described or shown in detail herein. It may be assumed that these corrections have been applied to the traces 1, 2, and 3.

The traces 1, 2, and 3 contain a substantially unlimited amount of information regarding the subsurface strata through which the seismic energy has been propagated. However, in the present state of the art, only certain portions of the traces may be interpreted. The most interpretable characteristics of seismic traces (in their order of decreasing importance) are: amplitude, phase correspondence, and shape (sometimes called character). In the present invention, any desired characteristic may be used to discriminate between portions of the traces. However, the amplitude of the seismic trace provides the simplest and preferred interpretable characteristic. Therefore, this description of the invention is principally devoted to the amplitude characteristic.

In automatic time or depth section plotters of this type, the traces 1, 2, and 3 are scanned by a device 4 which inspects each of the traces and selects portions of the traces on the basis of the desired characteristic. The selected portions are then used to initiate an electrical pulse, as by tripping a pulse generator 5, and the pulse is transferred into a visual representation by a plotter device 6. The plotter 6 and the scanner 4 are synchronized by any suitable device 7, in order that the visual representations of the pulses which are produced by the plotter will bear a relation to each other which is a function of the time relation between the conditions in the traces which gave rise to the pulses.

More specifically, the present invention relates to an improvement in the plotters of the general type shown in FIGURE 1 by controlling the shapes of the pulses produced by pulse generator 5 in response to some characteristics of the portions of the seismic traces which have been selected by scanner 4. For example the duration of the pulse may be related to the maximum amplitude of said portion, as will be described later in connection with FIGURE 2. Or, the intensity of the pulse may be controlled by the maximum amplitude of the said portion, as will be described in connection with FIGURE 3. In the preferred embodiment of the invention, as illustrated by FIGURE 4, both the duration and intensity of the pulses are controlled by the amplitude variations of the selected portion of the seismic trace.

Figure 2:
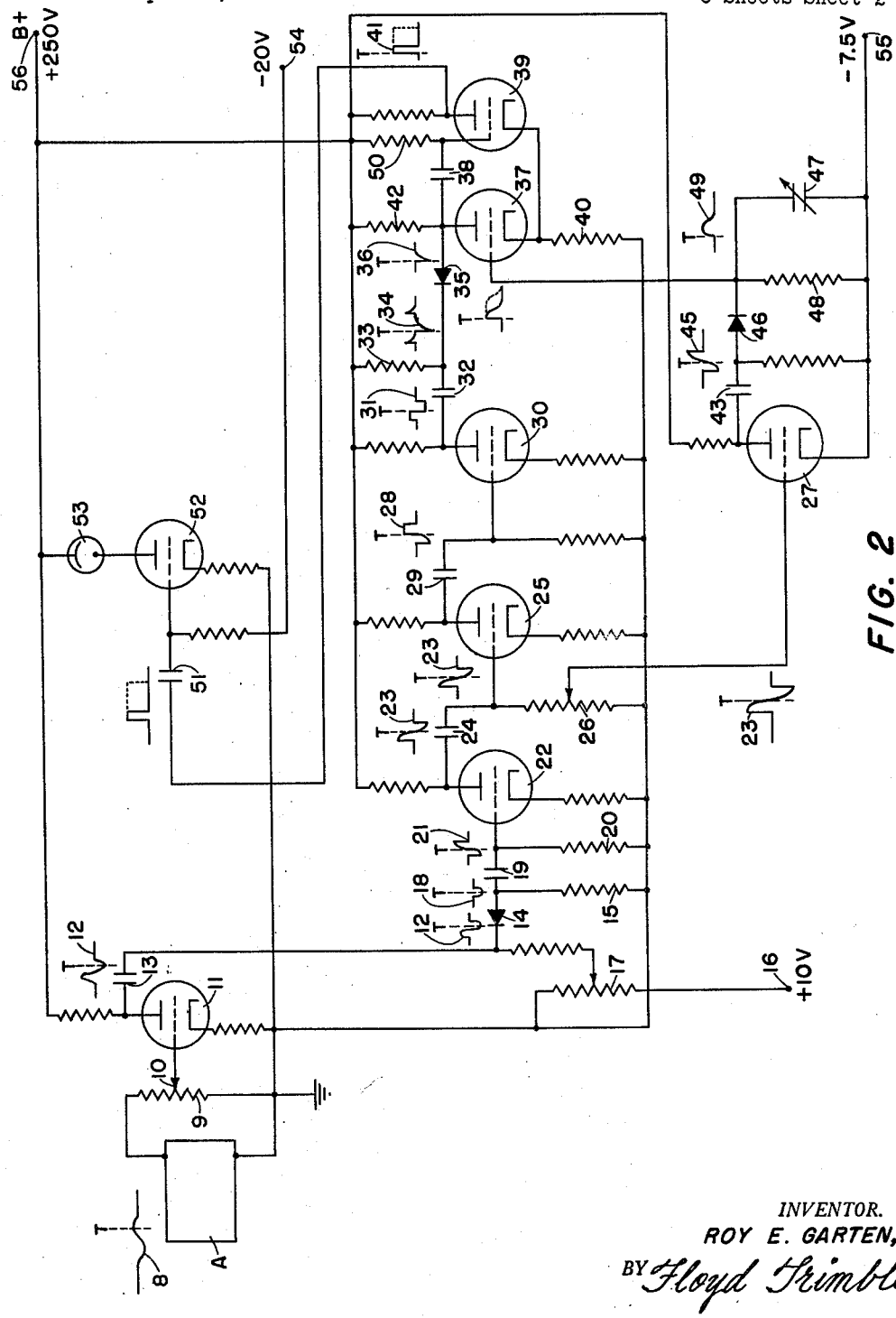
FIGURE 2 is a schematic wiring diagram of a first type of apparatus embodying the invention and in which the length of the mark is controlled by the maximum amplitude of the selected portion of the seismic trace.

Referring now to FIGURE 2, the curves between the different elements of the apparatus represent the successive electrical signal shapes occurring when an electrical signal consisting of a single cycle of a sine wave as shown at 8 is applied across the input terminals of the device. The time of occurrence of the peak or most positive point of the second half-cycle is shown by the vertical dashed line and is designated by T. It is assumed that this time T is considered representative of a reflection event, and therefore that it must control the location of the mark on the final visual representation which is indicative of this reflection event.

As will be explained in detail in the following, the apparatus described in FIGURE 2 generates a mark producing light flash starting at time T and having a time duration in accordance with the amplitude of the peak at time T.

The signal 8 is produced by a device A which may be either a seismometer or a reproducer of the original signal as previously indicated. Signal 8 is impressed across a potentiometer 9 having a movable contact 10 by means of which the sensitivity of the system may be adjusted. Signal 8 is applied to the grid of vacuum tube 11 where it is amplified and inverted and appears at the plate of tube 11 as signal 12. This signal is applied through capacitor 13 and rectifier 14 across resistor 15. Rectifier 14 is adjustably biased by means of a source 16 of positive voltage of approximately 10 volts energizing a potentiometer 17. Rectifier 14 passes only the portion of signal 12 which has a large enough negative value to overcome this bias (adjustable threshold). Consequently, the signal developed across resistance 15 is as indicated at 18 and consists only of the portion of the second half-cycle which has a negative amplitude larger than the threshold value. This signal 18 is applied across condenser 19 and resistor 20 having such values that the signal 21 developed across resistor 20 is the derivative of signal 18. This signal 21 is applied to the grid of vacuum tube 22 where it is amplified and inverted and appears at the plate of tube 22 as signal 23. It should be noted that the time T of occurrence of the negative peak of the original input signal 8 has been preserved in all these operations and is indicated now by the zero crossing at the center of signal 23. Signal 23 is applied through condenser 24 to the control grid of tube 25 and simultaneously—by means of adjustable potentiometer 26—to the control grid of tube 27. Thus, two signals 23 and 23' are derived from signal 23; one in tube 25 to be used to control the time of occurrence of an electrical pulse, and the other in tube 27 to be used to control the length of that pulse in accordance with the amplitude of the positive peak of signal 8.

Describing first the circuit associated with the first of these signals (23), tube 25 is biased so that it is driven beyond cutoff by the negative portion of signal 23. Consequently signal 28 appearing at the plate of tube 25 comprises a first half-portion which is the inverted first half-portion of signal 23 and a second half-portion which is an inverted and squared second half-portion of signal 23. Signal 28 is applied through condenser 29 to the control grid of tube 30 where it is inverted again, and, by proper biasing, tube 30 is driven beyond cutoff by the first half-portion of signal 28 so that the signal 31 appearing at the plate of tube 30 is squared on both sides, going instantaneously from a maximum positive value to a maximum negative value at time T. This signal 31 is differentiated by passing through condenser 32 and resistor 33 having proper values, and the resulting signal 34 is applied to diode 35 which retains only the negative pulse 36 of signal 34. This negative pulse 36 is applied to the plate of tube 37 and through the condenser 38 to the grid of tube 39. Tubes 37 and 39 are parts of a one-shot or monostable multivibrator triggered by the negative pulse 36. Therefore, when the negative pulse 36 is applied through condenser 38 to the grid of tube 39, this tube stops conducting and the voltage, due to the current in the cathode resistor 40, disappears at the cathode of tube 37, rendering is conductive. The current thus produced flowing through resistor 42 produces a potential drop which is applied to the grid of tube 39 through condenser 38, maintaining tube 39 in the non-conducting state until this potential has leaked off through resistor 50. A single positive pulse 41 starting at time T consequently appears at the plate of tube 39.

Describing now the circuit associated with the second signal 23', tube 27 inverts and amplifies signal 23' to produce signal 45 which is applied to diode 46 through condenser 43. Signal 45 is rectified by diode 46 and used to charge an adjustable condenser 47 in parallel with a leakage resistor 48. This arrangement provides the means for adjusting the rate of decay of the signal 49 which is used to control (through the grid of tube 37) the duration of the pulse 41 produced by the single-shot or monostable multi-vibrator. When signal 45 has large amplitude, condenser 47 receives a larger charge and the duration of signal 49 is increased, thereby maintaining tube 37 in its conducting state for a longer duration than when the amplitude of signal 42 is small.

The minimum duration of the output pulse 41 is determined by the value of bias 55 and by the time constant of the combination of condenser 38 and resistor 50 controlling the grid of tube 39. In a preferred embodiment, the values of these two parts are selected so that the amplitude at threshold level of signal 8 gives a minimum duration of pulse 41 of one millisecond.

The pulse 41 is applied through condenser 51 to the control grid of tube 52 and renders it conducting during the time length of the pulse. A glow lamp 53 is put in the plate circuit of tube 52, and its flashes are used in a standard seismic recording camera to make the marks on the recording medium. Since these elements are well known in the art, they have not been shown on FIGURE 2 for the sake of simplicity. The grid of tube 52 is biased beyond cutoff by a negative voltage source of about 20 volts, as indicated at 54, while the cathode of the tube 27 and grid of tube 37 are biased by a negative voltage source of 7.5 volts, as indicated at 55. Finally a B+ power supply provides the 250 volts high voltage necessary for the plates of all the triodes as indicated at 56.

Figure 3:
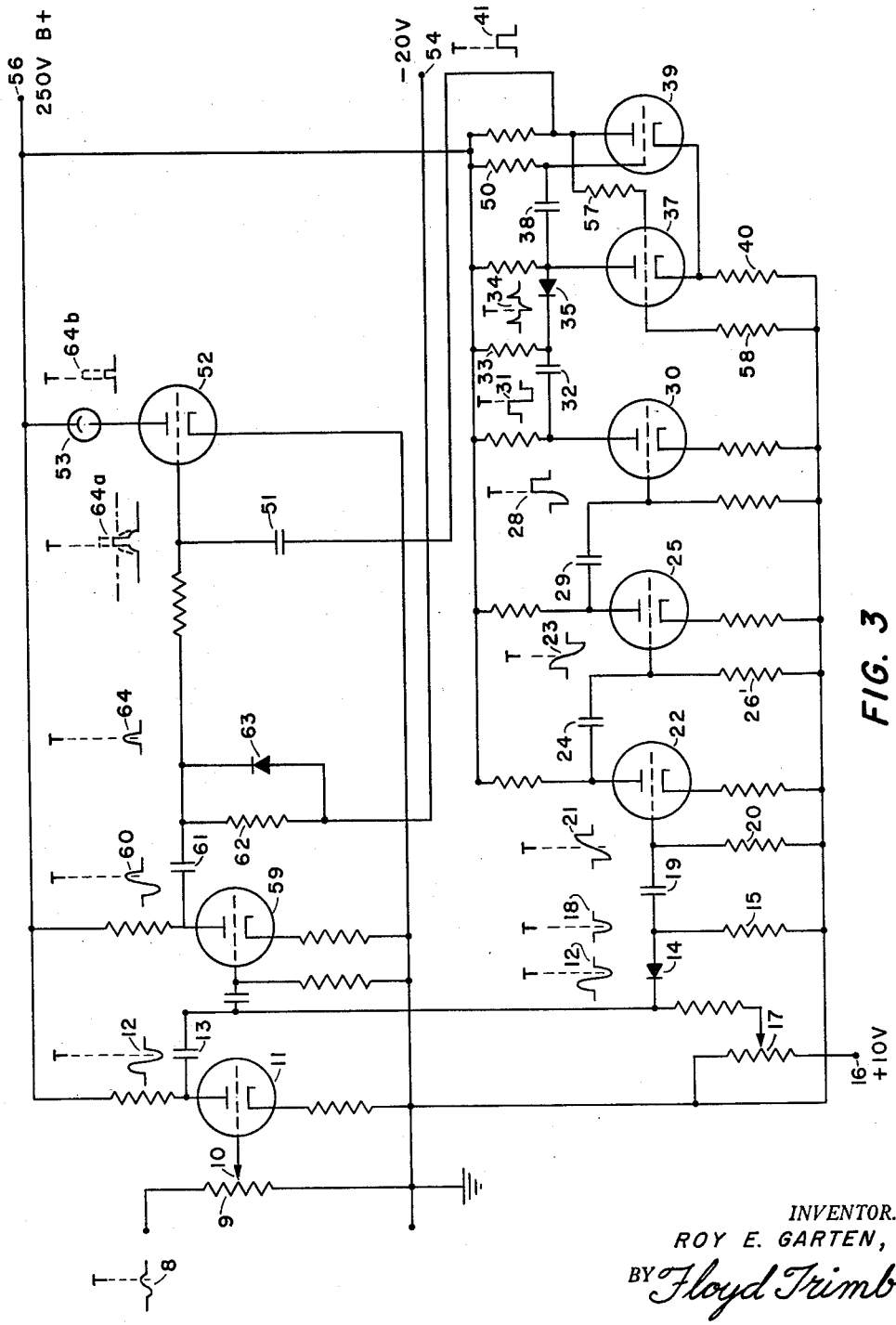
FIGURE 3 is a schematic wiring diagram of a second type of apparatus embodying the invention and in which the opacity of the mark is controlled by the maximum amplitude of the trace.
Figure 4:
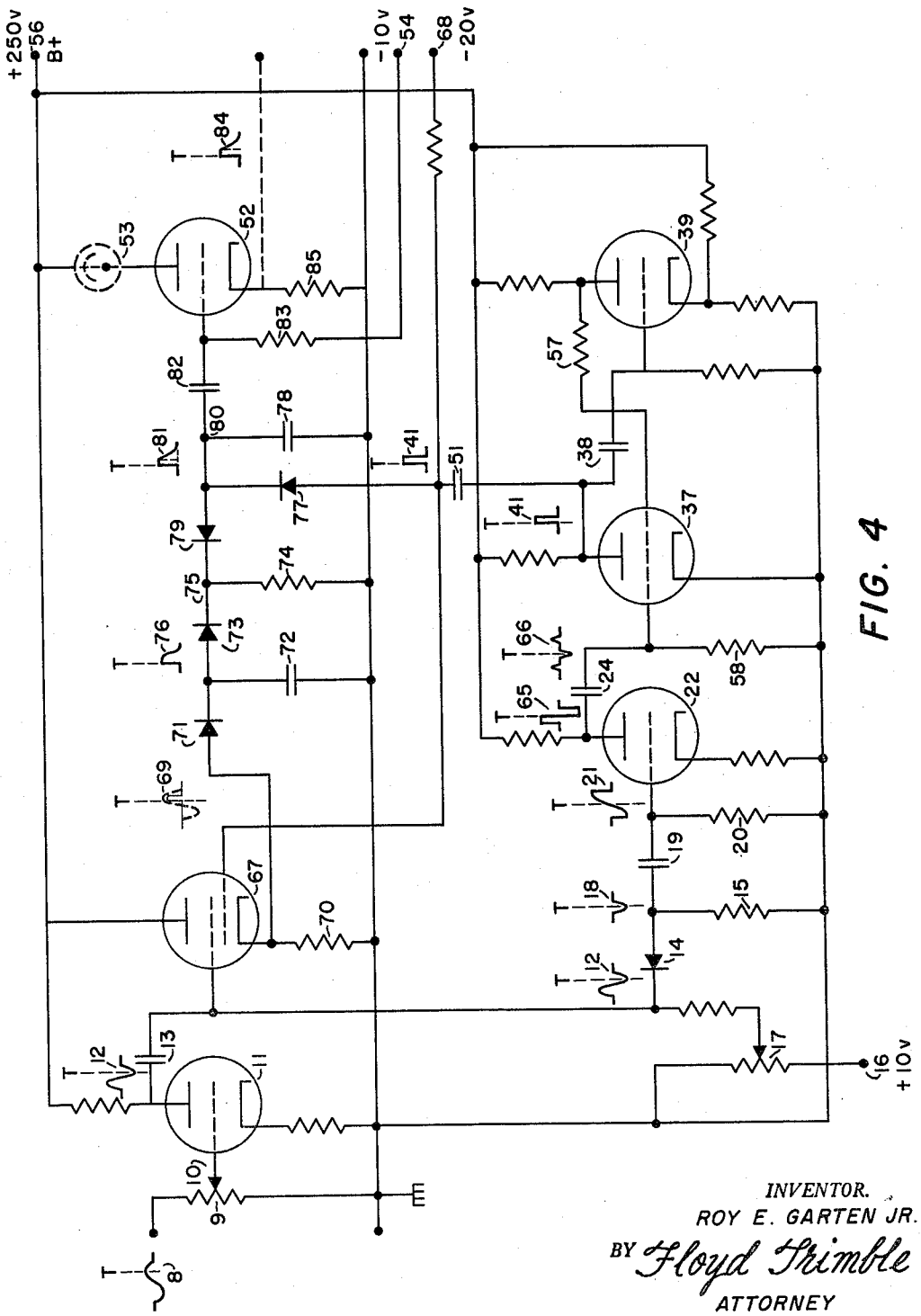
FIGURE 4 is a schematic wiring diagram of a third and preferred type of apparatus embodying the invention and in which both the opacity and the length of the marks are controlled by the amplitude variations of the seismic trace.

Referring now to FIGURE 3, a circuit is described in which the intensity of the light is controlled in accordance with the amplitude of the input signal above threshold level. Corresponding elements common to the apparatus of FIGURES 2 and 3 have been designated by the same reference characters.

It may be seen that, with the exception of minor changes, all the portions of the circuit associated with the synchronization of the pulse 41 produced by the single shot or monostable multi-vibrator comprising tubes 37 and 39 are identical to the corresponding portions of the circuit of FIGURE 2. The minor changes relate to the elimination of the pulse duration control circuits. Consequently, the potentiometer 26 is replaced by a constant bias resistor 26' and the control grid of tube 37 is biased by the arrangement of the two resistors 57 and 58, acting as a voltage divider between the plate of tube 39 and ground as required to complete the standard single-shot or monostable multivibrator circuit.

The important feature of FIGURE 3 resides in the indicator signal shaping circuit associated with the control of the intensity of the light flash in accordance with the amplitude of the portion of the input signal which surpasses the threshold level. This circuit comprises tube 59 used to amplify and invert signal 12 applied to its control grid. The new signal 60 appearing at the plate of tube 59 is applied through condenser 61 to a parallel arrangement comprising a resistor 62 and a diode 63. This arrangement retains, by rectification, the positive portion 64 of signal 60. The value of bias 54 is such that the maximum acceptable amplitude of signal 64 will bring the grid of tube 52 almost to the conducting point, as represented by the horizontal dashed line across signal 64a. The signal 64 is used to control tube 52 by being applied to its control grid simultaneously with the synchronizing pulse 41 produced by the other portion of the apparatus. Accordingly, the magnitude of the resulting signal 64a (comprising signal 41 riding over signal 64) varies directly in accordance with the amplitude of the peak of the positive portion of the input signal 8. Consequently, the plate current of tube 52 follows the same amplitude variations as shown by signal 64b, and, similarly, the intensity of the light flashes of bulb 53 in series in the plate circuit.

In FIGURE 4, an indicator signal forming circuit is illustrated in which the out put pulse or light flash varies simultaneously in duration and in intensity according to the peak amplitude of the selected portion of the seismic trace. By means of this circuit, each pulse is caused to diminish gradually from its initial peak amplitude to a very low value over a period of time immediately following its initiation; and the duration of this period of time is controlled by the relative magnitude of the peak amplitude of the selected portion of the input signal.

Again, elements of the apparatus illustrated in FIGURE 4 which correspond with elements present in the apparatus of FIGURES 2 and 3 are designated with the same reference characters. The lower portion of FIGURE 4 corresponds to the synchronizing circuit controlling the time of initiation of the pulse or light flash, while the top portion relates to the circuit controlling the duration and rate of decay of the pulse.

In the synchronizing circuit, it may be seen that it is identical to the circuits of FIGURES 2 and 3 down to the input of tube 22. However, in this embodiment, tube 22 is driven beyond cutoff and saturation so that the output signal 65 of tube 22 consists of two opposed polarity square pulses immediately adjacent to each other. By differentiation by means of condenser 24 and resistance 58, signal 66, comprising a large negative pulse at time T between two smaller positive pulses, is formed and applied to the grid of tube 37, the first element of the monostable multivibrator. Consequently, the output signal 41 of this multivibrator consists of a short pulse of one millisecond duration, for example, occurring at the time T of the peak of the selected portion of the input signal 8.

In the circuit controlling the duration and rate of decay of the output pulse or light flash, use is made of a tetrode 67 forming a cathode follower amplifier stage and gate for signal 12. The suppressor grid of tetrode 67 is controlled by the pulse 41 of the monostable vibrator fed through condenser 51. When no pulse is present, the suppressor grid of tube 67 is maintained at a negative voltage of about 20 volts provided by source 68. This voltage is sufficient to prevent conduction in tube 67. Therefore, the output signal 69 of tube 67 developed across its cathode resistor 70 comprises a one millisecond pulse modulated in amplitude by the magnitude of the peak of the selected portion of input signal 8. The signal 69 is then applied to the indicator signal shaping circuit as follows. Pulse 69 is rectified by diode 71 and used to charge condenser 72. This condenser leaks off through diode 73 and resistor 74. The resulting current flow through resistor 74 causes the potential at 75 to decay from the amplitude of signal 69 to zero at a rate depending on the time constant of the combination of condenser 72, diode 73, and resistor 74. This produces signal 76.

The one millisecond pulse 41 produced by the monostable multivibrator is also applied through rectifier 77 and charges condenser 78. This condenser 78 can discharge only through diode 79 and resistor 74 and, therefore, only when the voltage at 75 has fallen below the voltage at which condenser 78 has been charged. The resulting voltage 81 at 80 is applied through capacitor 82 to the control grid of tube 52. This grid is biased through resistor 83 by a negative voltage source 54 of about 10 volts to maintain tube 52 at cutoff when the signal 81 at 80 is below a predetermined level. Since the potential at point 75 is positive in polarity and decreases from a maximum value proportional to the amplitude of signal 69, and the charge on capacitor 78 must leak off through point 75, the potential at that point will control the discharge time of condenser 78. Therefore, the potential at point 80, shown as signal 81, will decrease at a rate inversely proportional to the amplitude of signal 69.

The output of tube 52 may be used to produce a light flash by means of a flash bulb 53 placed in series in the plate circuit of tube 52. If, on the other hand, the output signal is desired in electrical form, for example for display on an oscilloscope, tube 52 may be hooked-up as a cathode follower amplifier and the output voltage 84 would appear across the cathode resistor 85. Accordingly, signal 84, or the light flash produced by bulb 53 and used in the plotter, will have its starting amplitude always determined by the amplitude of the pulse 41 produced by the monostable multivibrator each time the input signal exceeds the threshold value, but the time interval during which this amplitude will return to zero will be closely proportional to the amplitude of the peak of the selected portion of the input signal 8.

Figure 5:
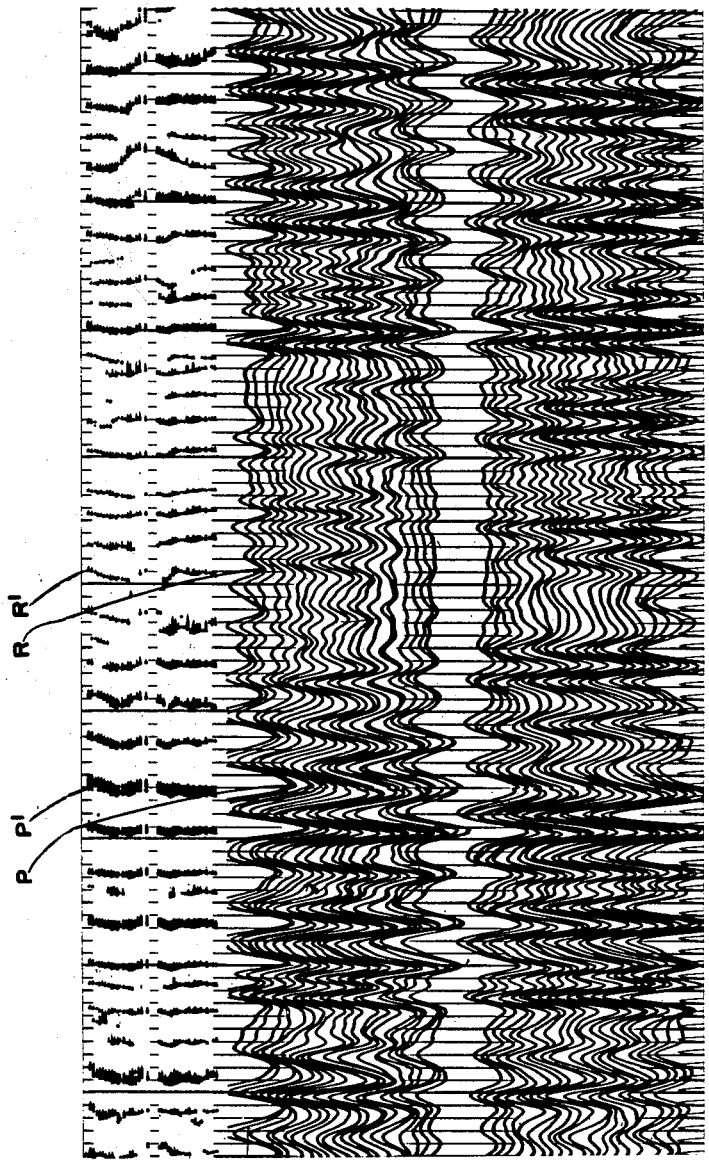
FIGURE 5 is a reproduction of a portion of an actual seismogram and the corresponding time section produced by the apparatus illustrated in FIGURE 4.

FIGURE 5 is representative of a portion of a time section obtained by means of the apparatus shown in FIGURE 4. A portion of a seismic oscillograph record is shown side-by-side with the corresponding plotted section.

The oscillograph record and the plotted section were made simultaneously from a reproduction of a magnetic tape recording made in the field. Time is increasing to the right.

A plurality of reflection arrivals spaced along the record and separated by lower amplitude variations of no value for structural interpretation are noticeable on this portion of a seismogram.

In this case, troughs (or negative peaks) have been used as selected portions of the trace to be transferred from the record to the time section. Therefore, the bottom of each trough exceeding the threshold value determines the time at which a mark is started on the seismic section. A particularly deep trough is indicated at P and a rather shallow one at R on the seismogram. The corresponding marks are indicated at P' and R' on the time section. It may be seen that the length of each mark and the resulting visual contrast is closely related to the depth of each respective trough on the seismogram.

In this manner the outstanding seismic events will be distinguished from the weaker events by plots of wider dimensions with resulting greater contrast. The plotted section will also show the specific time of the peak or trough of the seismic signal, since each electrical pulse is initiated at that instant of time, and is shown as the start of each plot. If the completed seismic section were placed in a position for viewing as a cross section of the earth, the upper edge of each plot would represent that specific point.

It is clear that other trace characteristics than amplitude such as slope or breadth of the peaks or troughs could have been selected. Persons skilled in the art of seismic prospecting know that phase relationship between successive traces also carries great interpretational significance. If such a criterion is desired to be used, it is a simple matter to control the generation of the electrical pulses by time coincidence circuits controlled by the predetermined criterion.

Changes may be made in the combination and arrangement of steps and elements as heretofore set forth in this specification and shown in the drawings, it being understood that changes may be made in the precise embodiments shown and described without departing from the spirit and scope of the invention as set forth in the following claims.

I claim:

1. A seismic data plotting means for a signal having distinguishing characteristics comprising:
   (a) a seismic signal input means;
   (b) a signal gating means;
   ($b_1$) a signal biasing means;
   (c) means connecting said seismic signal input means to said signal gating means;
   ($c_1$) means connecting the input of said seismic input means to said signal biasing means;
   (d) a pulse synchronizing means having an input connected to the output of said signal biasing means and forming pulses which are characteristic in time occurrence with a selected electrical characteristic of a seismic signal applied to said input means;
   (e) means connecting the output of said pulse synchronizing means to said signal gating means in a manner adapted to unblock said signal gating means;
   (f) indicator signal shaping means having a first input connected to the output of said signal gating means and a second input connected to said synchronizing circuit means and responsive to said pulses from said synchronizing means and said signal from said seismic signal input means wherein the signal will be formed at an output of said indicator signal shaping means which will be shaped in accordance with a selected characteristic of said input signal;
   (g) a recording medium; and
   (h) an indicating means having its input connected to an output of said indicator signal shaping means and for forming an image on the recording medium in opaqueness and length in correspondence with the variation in said selected electrical characteristic.

2. A device as described in claim 1 wherein said indicator signal shaping means comprises a first, second, third and fourth diode serially connected, said first and second diode poled in the same direction and said third and fourth diode poled in the same direction but poled opposite to said first and second diode, said first diode connected to the output of said signal gating means, the junction of said first and second diode connected through a first capacitor to ground, the junction between said second and third diode resistively connected to ground, the junction between said third and fourth diode connected to said indicating means and a second capacitor to ground, and said fourth diode connected to the output of said synchronizing means, whereby a pulse from said synchronizing means will charge said second capacitor to a predetermined level, such that a signal when applied to said first input will charge said first capacitor causing the total voltage on said first and second capacitors to extend the length and height of said pulse applied to said indicating means.

3. A device as described in claim 1 wherein said indicator signal shaping means comprises an adding means having a first and second input and an output, means connecting said first input to the output of said seismic signal input means, means connecting said second input to the output of said synchronizing means, and means connecting the output of said signal shaping means to the input of said indicating means, whereby the amplitude at said first and second inputs of said adding means when added will cause said signal applied to said indicating means to increase in intensity in accordance with an increase in amplitude of said input signal.

References Cited in the file of this patent

UNITED STATES PATENTS

| | | |
|---|---|---|
| 2,745,985 | Lewis | May 15, 1956 |
| 2,779,869 | Gerks | Jan. 29, 1957 |
| 2,791,228 | Meier | May 7, 1957 |
| 2,817,815 | Evans | Dec. 24, 1957 |
| 2,940,061 | Piety | June 7, 1960 |
| 2,941,184 | Moody | June 14, 1960 |
| 2,967,291 | Carlisle | Jan. 3, 1961 |
| 3,008,792 | Cox | Nov. 14, 1961 |